US006415261B1

(12) United States Patent
Cybul et al.

(10) Patent No.: US 6,415,261 B1
(45) Date of Patent: *Jul. 2, 2002

(54) METHOD FOR MANAGING A FREQUENT SHOPPER PROGRAM AT AN E-COMMERCE SITE AND AN IN-STORE SITE

(75) Inventors: Richard C. Cybul; Robert M. Szabo; James J. Toohey, all of Boca Raton, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/048,511

(22) Filed: Mar. 26, 1998

(51) Int. Cl.⁷ .............................................. G06F 17/00
(52) U.S. Cl. ....................................................... 705/14
(58) Field of Search .............................. 705/14, 26, 16, 705/27; 707/10, 201

(56) References Cited

U.S. PATENT DOCUMENTS 5,764,973 A * 6/1998 Lunceford et al.
5,974,418 A * 10/1999 Blinn et al. .................. 707/100
6,154,738 A * 11/2000 Call ............................... 707/4

FOREIGN PATENT DOCUMENTS

JP          405002684 A   *   1/1993

OTHER PUBLICATIONS

Derwent—ACC–No: 1997–462595; Tokyo Electric, Aug. 1997.*
Graffin, A. "Object software holds promise to easily build distributed application", Network World, V. 11, Issue 2, p. 71+, Jan. 10, 1994.*
Ricciuti, M., "Oracle, Sybase readying gateway connections", InfoWorld, V. 16, Issue 36, p. 8+, Sep. 5,1994.*
Korzeniowski, P., "Gateway Link Legacy, Distributed Databases", Software Magazine, V. 12, Issue 15, p. 85+, Nov. 1992.*
Lyon, D., "Internet Servers–accessing the past: The Legacy is not lost", Computer Reseller News, Issue 770, pp. 101–102, Jan. 5, 1998.*
Lisker, Peter, "Reaching for the benefits of distributed databases", Network World. v. 11, Issue 1, start p. 33, Dec. 1993.*
Coleman, Mary, "Data synchronization: what to look for", Telemarketing. v. 14, Issue 3, start p. 120, Sep. 1995.*
Frook, John E., "E–Commerce Pack Links To Other Apps", Phillips Business Information's Internet Week, Issue 693, start p. 8, Dec. 1997.*
"Synchronlogic Offers Database Synchronization", Worldwide Databases, V. 9, Issue 6, start p. 1, Jun. 1997.*
Chris, John, "Elcom System will enable web transactions", InfoWorld, v. 18, Issue 42, start p. 46, Oct. 1996.*

(List continued on next page.)

Primary Examiner—James P. Trammell
Assistant Examiner—Pierre E. Elisca
(74) Attorney, Agent, or Firm—Akerman Senterfitt

(57) ABSTRACT

A method for managing a frequent shopper program at a site providing both electronic commerce (e-commerce) shopping and in-store shopping, comprising the steps of: establishing a point of sale (POS) system, having a POS loyalty database and a POS purchase history database; establishing a list builder tool having an on-line shopping history database; establishing a query interface enabling communications between the POS system, the list builder tool and a network browser; updating the on-line shopping history database with information from the POS purchase history database through the query interface; updating the POS purchase history database with information from the on-line shopping history database through the query interface; and, determining a shopper's entitlement to a frequent shopper discount by accessing information from the updated POS purchase history database and the updated on-line shopping history database.

24 Claims, 1 Drawing Sheet

OTHER PUBLICATIONS

Scott, M. J., "Developments in management–information systems in retailing", GEC Review, v. 2, No. 1, pp. 42–48. 1986.*

"Vision Factory: the Vision Factory redefines the "E" in E–commerce: "E" is for "easy" with new Cat@log direct to web suite . . . ", Business Wire, Dec. 1996.*

Butler, J, "Data, data everywhere, looking for a link", Software Magazine, v15n9, PP:64–73, Sep. 1995.*

"Repeat/more than 60 new products to be unveiled at DB/EXPO '96 . . . ", Business Wire, Dec. 1996.*

"Add BW)119–10/1; part one/unix Expo plus exhibitor previews", Business Wire, Dec. 1996.*

* cited by examiner

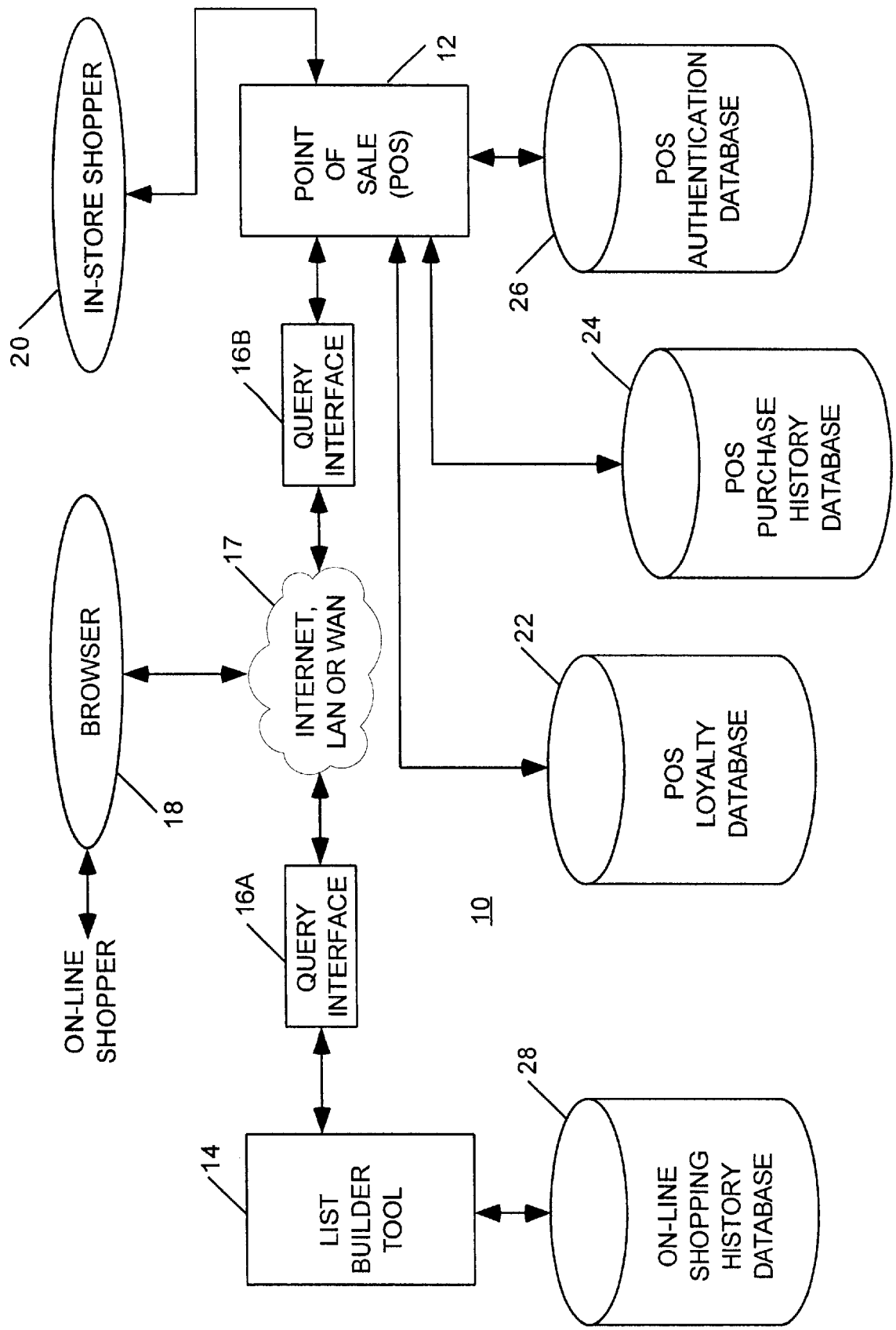

METHOD FOR MANAGING A FREQUENT SHOPPER PROGRAM AT AN E-COMMERCE SITE AND AN IN-STORE SITE

BACKGROUND OF THE INVENTION

1. Field of the Invention

This invention relates generally to the field of frequent shopper programs, and in particular, to a frequent shopper program which recognizes frequent shoppers who cross over between an electronic commerce (e-commerce) site and a related in-store site managed through a traditional point of sale (POS) system.

2. Description of Related Art

Developing the Internet as a consumer-direct marketing channel is receiving much focus by dealers of retail goods. However, current practice has identified several contributing factors acting as barriers to wide acceptance of this new marketing channel. First, consumers like the frequent shopper programs provided by the conventional in-store retailer. Second, consumers do not always want to shop exclusively on-line. On occasion, shoppers are likely to return to the conventional in-store site to view and perhaps purchase new items in person. Such shoppers are referred to herein as cross-over shoppers.

Modern POS systems provide the infrastructure to allow retail operators to offer frequent shopping programs to their customers. A frequent shopping program will typically segment customers into two or more groups depending on how much money the shoppers spend. The actual limits are typically determined by the retail operator taking into account the economics of the region served by the store and other criteria.

At check-out, the POS can reward the frequent shopper by applying a discount to the purchase. The size of the discount is usually computed as a function of the group to which the shopper belongs. Naturally, the best shoppers receive the highest discount.

Consumers who switch to an e-commerce site of the retailer, and thereafter choose to regularly patronize the on-line site will lose their standing as a frequent shopper of the in-store site and the benefits that go along with frequent shopper status. For those times shoppers choose to shop in the in-store site, this loss of status will lead to consumer dissatisfaction. Similarly, those shoppers who always patronized the on-line e-commerce site of the retailer are not likely to be recognized and rewarded as a frequent shopper for those times the shoppers shop in the in-store site. Again, this situation leads to consumer dissatisfaction.

SUMMARY OF THE INVENTION

In accordance with the inventive arrangements, a unique method provides an interface to an on-line vendor's e-commerce site that can extract a consumer's shopping habits from the history of the on-line vendor's shopping list database. The data extracted can then be used by the POS frequent shopper system to maintain an accurate picture of the consumer's true buying habits and reward consumers appropriately when consumers shop in the conventional store.

Any invention that will support POS frequent shopper programs whether the consumer shops in-store or on-line will provide significant advantages to the consumer in terms of the discounts and rewards offered by a conventional POS frequent shopping program. The retailer will also benefit by making both the in-store and on-line shopping experiences so attractive that the consumer will return for subsequent/replenishment shopping in-store or on-line.

A method for recognizing on-line shoppers as frequent shoppers requires several parts, and is advantageously implemented with a POS system having a frequent shopper database with access a shopper's list or lists of prior purchases from a selected on-line e-commerce site. A POS query interface can advantageously be implemented as a client/server-based tool. A list builder tool can query a POS system for the prior shopping history of a customer, when that customer has previously shopped the POS system or is otherwise of record in the POS system, for example as a result of a registration process. The query can be qualified by, for example, last purchase date, a range of dates, or a specific holiday period. The query can be qualified by other criteria as well. A customer is therefore known to the POS system when that customer is a member of a POS-managed frequent shopper or loyalty program.

A method for managing a frequent shopper program at a site providing both electronic commerce (e-commerce) shopping and in-store shopping, in accordance with an inventive arrangement, comprises the steps of: establishing a point of sale (POS) system, having a POS loyalty database and a POS purchase history database; establishing a list builder tool having an on-line shopping history database; establishing a query interface enabling communications between the POS system, the list builder tool and a network browser; updating the POS purchase history database with information from the on-line shopping history database through the query interface; and, determining a shopper's entitlement to a frequent shopper discount by accessing information from the updated POS purchase history database, whereby an in-store shopper's entitlement to a frequent shopper discount is also based on the in-store shopper's on-line purchasing history.

A method for managing a frequent shopper program at a site providing both electronic commerce (e-commerce) shopping and in-store shopping, in accordance with a further inventive arrangement, comprises the steps of: establishing a point of sale (POS) system, having a POS loyalty database and a POS purchase history database; establishing a list builder tool having an on-line shopping history database; establishing a query interface enabling communications between the POS system, the list builder tool and a network browser; updating the on-line shopping history database with information from the POS purchase history database through the query interface; and, determining a shopper's entitlement to a frequent shopper discount by accessing information from the updated on-line shopping history database, whereby an on-line shopper's entitlement to a frequent shopper discount is also based on the on-line shopper's in-store purchasing history.

A method for managing a frequent shopper program at a site providing both electronic commerce (e-commerce) shopping and in-store shopping, in accordance with another inventive arrangement, comprises the steps of: establishing a point of sale (POS) system, having a POS loyalty database and a POS purchase history database; establishing a list builder tool having an on-line shopping history database; establishing a query interface enabling communications between the POS system, the list builder tool and a network browser; updating the on-line shopping history database with information from the POS purchase history database through the query interface; updating the POS purchase history database with information from the on-line shopping history database through the query interface; and, determining a shopper's entitlement to a frequent shopper discount by accessing information from the updated POS purchase history database and the updated on-line shopping history database, whereby the shopper's entitlement to a frequent shopper discount is based on the shopper's on-line and in-store purchasing histories.

In each of the foregoing method inventive arrangements, the updating steps can take place on at least one of the following: a demand from the POS system; a demand from the list builder tool; a scheduled basis; and, automatically after the on-line shopping history database and the POS purchase history database undergo respective changes.

In each of the foregoing inventive arrangements, the method can further comprise the step of establishing a POS authentication database for the POS system.

In each of the foregoing inventive arrangements, the method can also further comprise the step of enabling the communications in the query interface establishing communications over at least one of the Internet, a wide area network and a local area network.

A frequent shopper program for a vendor site providing both electronic commerce (e-commerce) shopping and in-store shopping, in accordance with yet another inventive arrangement, comprises: a point of sale (POS) system, having a POS loyalty database and a POS purchase history database; a list builder tool having an on-line shopping history database; a query interface enabling communications between the POS system, the list builder tool and a network browser; means for updating the POS purchase history database with information from the on-line shopping history database through the query interface; and, means for determining a shopper's entitlement to a frequent shopper discount by accessing information from the updated POS purchase history database, whereby an in-store shopper's entitlement to a frequent shopper discount is also based on the in-store shopper's on-line purchasing history.

A frequent shopper program for a vendor site providing both electronic commerce (e-commerce) shopping and in-store shopping, in accordance with yet another inventive arrangement, comprises: a point of sale (POS) system, having a POS loyalty database and a POS purchase history database; a list builder tool having an on-line shopping history database; a query interface enabling communications between the POS system, the list builder tool and a network browser; means for updating the on-line shopping history database with information from the POS purchase history database through the query interface; and, means for determining a shopper's entitlement to a frequent shopper discount by accessing information from the updated on-line shopping history database, whereby an on-line shopper's entitlement to a frequent shopper discount is also based on the on-line shopper's in-store purchasing history.

A frequent shopper program for a vendor site providing both electronic commerce (e-commerce) shopping and in-store shopping, in accordance with yet another inventive arrangement, comprises: a point of sale (POS) system, having a POS loyalty database and a g POS purchase history database; a list builder tool having an on-line shopping history database; a query interface enabling communications between the POS system, the list builder tool and a network browser; means for updating the on-line shopping history database with information from the POS purchase history database through the query interface; means for updating the POS purchase history database with information from the on-line shopping history database through the query interface; and, means for determining a shopper's entitlement to a frequent shopper discount by accessing information from the updated POS purchase history database and the updated on-line shopping history database, whereby the shopper's entitlement to a frequent shopper discount is based on the shopper's on-line and in-store purchasing histories.

In each of the foregoing program inventive arrangements, the databases can be updated on at least one of: a demand from the POS system; a demand from the list builder tool; a scheduled basis; and, automatically after the on-line shopping history database and the POS purchase history database undergo respective changes.

In each of the foregoing program inventive arrangements, the program can further comprise a POS authentication database for the POS system.

In each of the foregoing program inventive arrangements, the communications enabled by the query interface is over at least one of the Internet, a wide area network and a local area network.

BRIEF DESCRIPTION OF THE DRAWINGS

The sole FIGURE is a block diagram of an e-commerce site with a query interface in accordance with the inventive arrangements.

DETAILED DESCRIPTION OF THE PREFERRED EMBODIMENTS

A block diagram of an e-commerce site 10 having a POS system and a POS system query interface is shown in the Figure. The e-commerce site comprises, in broad terms, a POS system 12 of the kind that supports a frequent shopper or loyalty program and a list builder tool 14. The POS system can be like any of the POS systems now in use in many retail stores and stores of retail chains. IBM currently markets a POS system with loyalty program capabilities. The list builder tool 14 can be any list builder tool with an on-line shopping history database. In this regard, the POS system and the list builder tool are to be thought of as generic examples of their respective functions. The inventive arrangements taught herein are related to the manner in which the POS system and the list builder tool are arranged with respect to one another to create a unique query interface which facilitates shopper use of the e-commerce site, rather than to the specific operational details of the POS system and the list builder tool in and of themselves.

The POS system 12 must have two sets of information in order for the query interface to be implemented, and optionally, a third database. The required databases are represented in the drawing as a POS loyalty database 22 and a POS purchase history database 24. The optional database is represented by a POS authentication database 26. The POS system can be implemented as a stand alone computer server or as a local area network (LAN) or as a wide area network (WAN). The databases 22, 24 and 26 can reside in the same computer as the server or in one or more separate computers on a LAN or WAN, or can even be connected over the Internet.

The list builder tool must have a set of information pertaining to historical purchase data of the e-commerce site shoppers, represented by the on-line shopping history database 28. The on-line shopping history database is local to the list builder tool, or connected to the list builder tool over a network On-line shoppers can access the e-commerce site through a web browser 18 and the Internet, a WAN and/or a LAN, represented by cloud 17. On-line shoppers can access the list builder tool 14 and/or the POS system 12. A client/server query interface is represented by blocks 16A and 16D in order to demonstrate the distributed nature of the query interface. The distributed function represents the fact that under some circumstances the POS system will act as a server and the list builder tool will act as a client, whereas under other circumstances, the list builder tool will act as a server and the POS system will act as a client. In either case, the query interface 16A, 16B is an interface that enables communications between the POS system and the list builder tool. The query interface 16A, 16B can enable the communications over a LAN or WAN or even the Internet as shown by cloud 17.

It should be appreciated that the relationship of the query interface to the list builder tool, the POS system, the browser and the Internet, LAN or WAN cloud is represented at a high systems or conceptual level, for purposes of simplifying the accompanying explanation, rather than being shown strictly topologically.

As a practical matter, shoppers will, at one time or another, want to shop in person, represented by a personal interface 20 for an in-store shopper. It is an aspect of the inventive arrangement that the in-store shopping activities of loyalty customers will become part of the on-line shopping history database through the query interface 16. Accordingly, the list builder tool 14 can advantageously request purchase histories from the POS system 12 on demand.

The POS system can be used to provide consumers with a frequent shopper program in which both on-line purchases and in-store purchases are used in determining an in-store shopper's entitlement to a frequent shopper discount. This can be accomplished by allowing the POS system to request on-line purchase histories from the list builder tool and by allowing the list builder tool to request in-store purchase histories from the POS system, on demand or on a regular basis through periodic and scheduled updates. The updating can also take place automatically after the on-line shopping history database and the POS purchase history database undergo respective changes.

Creating and maintaining electronic shopping lists has several aspects. The unique combination described hereinafter in detail allows an arbitrary list building tool to access a customer's shopping history from a selected POS system. Methods for implementing an e-commerce site as described herein can support any present or future POS system. For present POS systems, implementation will be largely dictated by the architecture of the POS system. At a minimum, the POS system must provide a loyalty program, that is a frequent shopper card, or the electronic equivalent, and track purchases based on the loyalty or frequent shopper card identification. Future POS systems need only to incorporate these elements into their basic design.

Basic information about the loyalty customers or frequent shoppers is kept in a first database. This database can contain, without limitation: a frequent shopper identification (FSID), preferred payment methods and demographic information such as name, address, family size, number of children and the like. This information is used to locate the shopper's purchase history via the FSID.

A second database of historical purchase data, indexed by loyalty customer, is defined by the POS system and should minimally contain, on a per loyalty customer basis, a purchase time stamp and a list of items purchased. For each item on a given list, the following information should be provided, at a minimum: the universal product code (UPC), quantity and purchase price. This information can be combined to provide a historical list for a given shopping experience.

A list builder tool or service is provided with a third database, having on-line shopping history data.

A fourth database, which is optional., contains configurable security and authentication features.

The methods taught herein are described essentially as software based, including a client/server query interface with configurable security and authentication features (which are optional). Other implementations are not intended to be excluded, including manual processing. The POS system can respond to queries against the database of historical purchase data, indexed by loyalty customer, using a communications method defined by the POS system. For example, queries could be handled over a TCP/IP network using special sockets. Furthermore, the communications protocol should be flexible enough to allow the POS system to batch queries and respond later or to respond in real-time. As a result, the client should be equally flexible.

At minimum, a query to the POS system should contain the FSID and a function code. For purposes of explaining the inventive arrangements, a function code has been minimally defined as a request for a purchase history. When requesting a purchase history, a date must be provided. The date can be specified in several forms, for example a specific date (Jul. 10, 1997), an explicit range of dates (Jul. 10, 1997, Jul. 20, 1997), an implicit date (last on-line purchase or last in-store purchase), or an implicit range of dates (Thanksgiving, Halloween, or any other holiday).

In response to any of the above queries, the POS system (server) will return the data requested or a failure indication, if any. The data returned by the POS system cannot, of course, exceed that which it has available in its database of historical purchase data and the database of loyalty customers.

The inventive arrangements can be used to extract data from a shopper's historical shopping records from related on-line and in-store shopping, so that frequent shopper status is at all times related to the totality of the shopper's purchases from the retailer or vendor irrespective of the shopper's choice of site at any particular time. The enhanced frequent shopper program according to the inventive arrangements removes yet another significant barrier to adoption of on-line shopping.

What is claimed is:

1. A method for managing a frequent shopper program in an electronic commerce (e-commerce) system permitting both on-line shopping and in-store shopping, comprising the steps of:

establishing a point of sale (POS) system for a store, said POS system having a POS loyalty database and a POS purchase history database;

establishing a shoppable on-line e-commerce list builder tool in an e-commerce site, said on-line list builder tool having an on-line shopping history database which is distinct from said POS purchase history database;

establishing a query interface enabling communications between said POS system, said on-line e-commerce list builder tool and a network browser; and, updating said POS purchase history database with information from said on-line shopping history database through said query interface;

whereby an in-store shopper's purchase history is also based on said in-store shopper's on-line e-commerce purchasing history.

2. The method of claim 1, wherein the updating step takes place on at least one of:

a demand from said POS system;

a scheduled basis; and, automatically after said on-line shopping history database changes.

3. The method of claim 1, further comprising the step of establishing a POS authentication database for said POS system.

4. The method of claim 1, further comprising the step of enabling said communications in said system query interface establishing communications over at least one of the Internet, a wide area network and a local area network.

5. A method for managing a frequent shopper program in an electronic commerce (e-commerce) system permitting both on-line shopping and in-store shopping, comprising the steps of:

establishing a point of sale (POS) system for a store, said POS system having a POS loyalty database and a POS purchase history database;

establishing a shoppable on-line e-commerce list builder tool in an e-commerce site, said on-line list builder tool having an on-line shopping history database which is distinct from said POS purchase history database;

establishing a query interface enabling communications between said in-store POS system, said on-line e-commerce list builder tool and a network browser; and, updating said on-line shopping history database with information from said POS purchase history database through said query interface;

whereby an on-line e-commerce shopper's purchase history is also based on said on-line e-commerce shopper's in-store purchasing history.

6. The method of claim 5, wherein the updating step takes place on at least one of the following:

a demand from said list builder tool;

a scheduled basis; and, automatically after said POS purchase history database changes.

7. The method of claim 5, further comprising the step of establishing a POS authentication database for said POS system.

8. The method of claim 5, further comprising the step of enabling said communications in said system query interface establishing communications over at least one of the Internet, a wide area network and a local area network.

9. A method for managing a frequent shopper program in an electronic commerce (e-commerce) system permitting both on-line shopping and in-store shopping, comprising the steps of:

establishing a point of sale (POS) system for a store, said POS system having a POS loyalty database and a POS purchase history database;

establishing a shoppable on-line e-commerce list builder tool in an e-commerce site, said on-line list builder tool having an on-line shopping history database which is distinct from said POS purchase history database;

establishing a query interface enabling communications between said in-store POS system, said on-line e-commerce list builder tool and a network browser;

updating said on-line shopping history database with information from said POS purchase history database through said query interface; and, updating said POS purchase history database with information from said on-line shopping history database through said query interface;

whereby said shopper's purchase history is based on said shopper's on-line and in-store purchasing histories.

10. The method of claim 9, wherein said updating steps take place on at least one of:

a demand from said POS system;

a demand from said list builder tool;

a scheduled basis; and, automatically after said on-line shopping history database and said POS purchase history database undergo respective changes.

11. The method of claim 9, further comprising the step of establishing a POS authentication database for said POS system.

12. The method of claim 9, further comprising the step of enabling said communications in said system query interface establishing communications over at least one of the Internet, a wide area network and a local area network.

13. A frequent shopper management program for a vendor electronic commerce (e-commerce) system permitting both on-line shopping and in-store shopping, comprising:

a point of sale (POS) system for a store, said POS system having a POS loyalty database and a POS purchase history database;

a shoppable on-line e-commerce list builder tool in an e-commerce site, said on-line list builder tool having an on-line shopping history database which is distinct from said POS purchase history database;

a query interface enabling communications between said in-store POS system, said on-line e-commerce list builder tool and a network browser; and, means for updating said POS purchase history database with information from said on-line shopping history database through said query interface;

whereby an in-store shopper's purchase history is also based on said in-store shopper's on-line e-commerce purchasing history.

14. The program of claim 13, wherein the updating step takes place on at least one of:

a demand from said POS system, a scheduled basis; and, automatically after said on-line shopping history database changes.

15. The program of claim 13, further comprising a POS authentication database for said POS system.

16. The program of claim 13, wherein said communications enabled by said system query interface is over at least one of the Internet, a wide area network and a local area network.

17. A frequent shopper management program for a vendor electronic commerce (e-commerce) system permitting both on-line shopping and in-store shopping, comprising:

a point of sale (POS) system for a store, said POS system having a POS loyalty database and a POS purchase history database;

a shoppable on-line e-commerce list builder tool in an e-commerce site, said on-line list builder tool having an on-line shopping history database which is distinct from said POS purchase history database;

a query interface enabling communications between said in-store POS system, said on-line e-commerce list builder tool and a network browser; and, means for updating said on-line shopping history database with information from said POS purchase history database through said query interface;

whereby an on-line e-commerce shopper's purchase history is also based on said on-line e-commerce shopper's in-store purchasing history.

18. The program of claim 17, wherein the updating step takes place on at least one of the following:

a demand from said list builder tool;

a scheduled basis; and, automatically after said POS purchase history database changes.

19. The program of claim 17, further comprising a POS authentication database for said POS system.

20. The program of claim 17, wherein said communications enabled by said system query interface is over at least one of the Internet, a wide area network and a local area network.

21. A frequent shopper management program for a vendor electronic commerce (e-commerce) system permitting both on-line shopping and in-store shopping, comprising:

a point of sale (POS) system for a store, said POS system having a POS loyalty database and a POS purchase history database;

a shoppable on-line e-commerce list builder tool in an e-commerce site, said on-line list builder tool having an on-line shopping history database which is distinct from said POS purchase history database;

a query interface enabling communications between said in-store POS system, said on-line e-commerce list builder tool and a network browser;

means for updating said on-line shopping history database with information from said POS purchase history database through said query interface; and, means for updating said POS purchase history abase with information from said on-line shopping history database through said query interface;

whereby said shopper's purchase history is based on said shopper's on-line and in-store purchasing histories.

22. The program of claim 21, wherein said updating steps take place on at least one of:

a demand from said POS system;

a demand from said list builder tool;

a scheduled basis; and, automatically after said on-line shopping history database and said POS purchase history database undergo respective changes.

23. The program of claim 21, further comprising a POS authentication database for said POS system.

24. The program of claim 17, wherein said communications enabled by said system query interface is over at least one of the Internet, a wide area network and a local area network.

* * * * *